Nov. 23, 1937.  H. HARRISON  2,100,077
DISPLAY DEVICE
Filed May 1, 1935
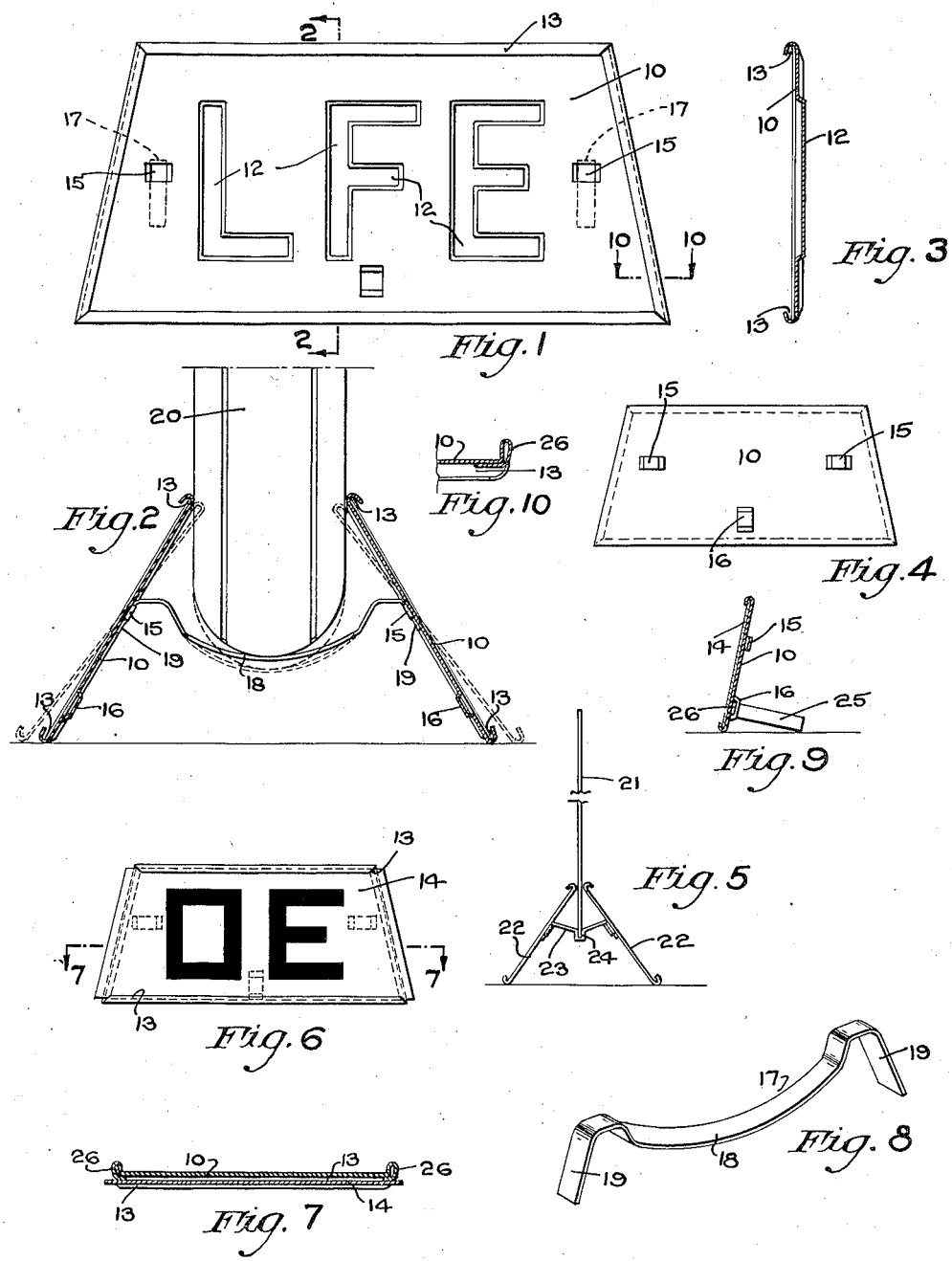
Inventor
HENRY HARRISON
By Lem Edelson
Attorney Patented Nov. 23, 1937

2,100,077

UNITED STATES PATENT OFFICE 2,100,077

DISPLAY DEVICE

Henry Harrison, Conshohocken, Pa.

Application May 1, 1935, Serial No. 19,163

2 Claims. (Cl. 248—174)

This invention relates to improvements in holders and easels broadly, and particularly to types thereof which are particularly adapted to support vehicle tires in upright position, as for display and advertising purposes.

Among the principal objects of the invention is to provide a holder of such form and construction that it may be shipped in the smallest or thinnest package possible, yet when opened and assembled for use presents a holder that to all practical purposes is of sufficient rigidity and strength to withstand the weight of the usual vehicle tire alone, or of a combined vehicle wheel and tire unit.

A further and more specific object is to provide a holder of the character mentioned, comprising a pair of opposed angularly adjustable plates, normally connected together by at least one but preferably two (or more) resilient members, removably attached to said plates and upon an intermediate portion of which a tire or other object is adapted to rest, the arrangement being such that the weight of the tire or the like resting upon said one or more resilient members causes the central portions of the latter to be depressed, and the upper portions of said plates to be thereby brought together in contracted or binding relation upon the opposite sides of such tire or the like, while the lower or opposite portions of said plates rest upon the floor or other suitable surface, thereby providing a solid and substantial support for the tire or other article disposed between the opposed plates.

Still another object is to provide the plates in the improved plate structure with variously directed corrugations for the purpose of stiffening the plates, when formed from a thinner gauge of metal than would otherwise be necessary in order to operatively function, if depending solely upon their inherent rigidity, such corrugations being arranged in conventional form or in the shape of letters, figures, or other characters, such as may be used to identify the origin or ownership of the holder and/or supported tire, or may serve as an advertising medium.

And a still further object is to provide a sign holder comprising a single plate provided with an embossed strap or the like, into which may be detachably inserted one end portion of a leg element, adapted to normally extend laterally from or in angular relation with respect to said plate, with some part of said element spaced from said plate, and adapted to rest upon the floor or other suitable support, so as to maintain said plate in substantially upright position, or at least in a predetermined angular relation with respect to such floor or other support, and to thereby hold a sign or other device in such a position as to insure its maximum visibility.

Still other objects and advantages of the invention will appear more fully hereinafter.

The invention consists substantially in the combination, construction, location and relative arrangement of parts, all as will appear more fully hereinafter, as shown in the accompanying drawing and as finally pointed out in the appended claims.

In the said accompanying drawing, which illustrates certain preferred embodiments of the invention:—

Figure 1 is an elevational view of the device constructed in accordance with and embodying the principles of the present invention;

Figure 2 is a section taken on the line 2—2 of Figure 1;

Figure 3 is a vertical sectional view of one of the side plates of the device shown in Figures 1 and 2;

Figure 4 is an elevational view showing the inner face of a side plate;

Figure 5 is an end elevational view of a slightly modified form of holder, shown as operatively supporting a sign or similar device in upright position;

Figure 6 is an elevational view of a single plate shown adapted to receive a removable advertising insert or the like;

Figure 7 is a horizontal section taken on the line 7—7 of Figure 6;

Figure 8 is a perspective view of one of the resilient plate-connecting members;

Figure 9 is a vertical sectional view of one of the side plates to which is attached a rest for supporting said plate in the form of a display sign or the like; and Figure 10 is a sectional view taken on the line 10—10 of Figure 1.

Referring now to the drawing and more particularly to Figures 1 to 4 thereof, it will be observed that the holder of the present invention which, while designed primarily to support vehicle tires, is nevertheless adapted to support various other articles, generally consists of a pair of opposed side plates 10—10 which are interconnected by two or more resilient connecting straps 17, all in the manner and for the purpose to be described more fully hereafter. Each of the side plates 10 comprises a substantially planular body portion, which is preferably stiffened by any suitable number and arrangement of corrugations 12. These corrugations may be employed merely for stiffening purposes or they may be employed for the additional purpose of identifying in any desired manner the name or character of the device supported by the holder. In Figure 1 the corrugations are arranged in the form of a combination of letters.

The upper and lower longitudinally extending edges of each side plate 10 are respectively turned outwardly to provide a pair of opposed longitudinally extending channels 13—13 between which may be slidably received an advertising card or plate 14 or the like (see Figures 6 and 7). This card may be formed of metal, cardboard or other suitable material, and may bear upon its exposed surface any desired form and arrangement of suitable indicia for the purposes desired. Each of the opposed main side plates 10—10 of the holder is preferably provided at either end thereof with an embossed or inwardly pressed portion 15, these embossed portions being preferably disposed slightly above the horizontal center line of each plate. Each plate may also be provided with a third pressed-in portion 16 which is preferably arranged adjacent the bottom edge of each plate 10 and centrally between the opposite ends thereof. The pressed-in portions 15—15 are each characterized in that the bodies thereof which are offset inwardly from the plane of the plate 10 are severed from the said plate along the horizontally extending top and bottom edges thereof to form in effect a strap the body of which is spaced from the body of the plate 10. The third embossed portion 16 is substantially similar to the portions 15—15 but it is preferably turned at right angles to the latter so that the opposed severed lines thereof extend vertically rather than horizontally. It will be understood, of course, that the pressed-in portions 15—15 are correspondingly located in each of the two plates 10—10 so that when the plates are assembled in the manner to be immediately described the pressed-in portions of each plate are respectively in alignment with the corresponding portions of the opposite plate.

In Figure 8 there is illustrated a preferred form of connecting member 17 for joining together the opposed plates 10—10. Each of these connecting members 17 is preferably formed of resilient material, such as spring steel or the like, and comprises an intermediate arched body portion 18 the opposite extremities of which respectively terminate in downwardly extending end portions 19—19. The end portions 19—19 of each connecting member 17 are adapted to be removably inserted in the oppositely positioned straps 15—15 of the plates 10—10, as is best shown in Figures 1 and 2, wherein it will be observed that two connecting members 17 are employed for interconnecting the plates 10—10. The said connecting members 17 are of such design that when they are disposed in interconnecting relation between the opposed plates 10—10, the latter normally assume the dotted line positions shown in Figure 2. Due to the resilient nature of the said connecting member 17, upon pressing the bottom edges of the plates 10—10 together, the upper edges thereof may be swung outwardly and away from each other to permit the free passage therethrough of an article to be supported, such as the vehicle tire 20, shown in Figure 2. This vehicle tire rests upon the connecting members 17—17 and due to the weight of the tire the said connecting members are urged downwardly into the dotted line position shown in Figure 2, in consequence of which the upper edges of the plates 10—10 are caused to bind more or less tightly against the opposite side walls of the portions of the vehicle tire disposed between the plates. The concave intermediate portion of the straps 17—17 operate conjointly with the upper edges of the plates 10—10 to maintain the vehicle tire or other article in substantially vertical or upright position within the holder, the latter being founded securely upon the supporting surface, such as a table, floor or the like. Due to the binding action of the top edges of the plates 10—10 against the side walls of the vehicle tire, it will be apparent that once the latter is properly inserted between the said side plates, the tire and the side plates may be lifted bodily should it be desired to change the location of the displayed tire.

Figure 5 illustrates a modified design of the holder for supporting an advertising or display card 21. In this modified design of holder, the side plates 22—22 are substantially identical in form to the side plates 10—10 of the holder shown in Figures 1 and 2. The connecting member or members 23 differ, however, from the connecting member 17 in that it is provided with a centrally disposed downwardly extending recess 24 which is adapted to receive the lower edge of the card 21 or other such similar object. Moreover, the portions of the connecting member or members 23 extending to either side of the central recess 24 are angularly so related as to cause the upper edges of the opposed plates 22—22 to abut one another, thereby insuring that the said upper edges coact to yieldingly grip the card 21 therebetween. Obviously, the holder of Figure 5 need not be as large nor of the substantial construction as the holder of Figures 1 and 2. Moreover, it will be understood that whereas in the holder of Figure 2 the weight of the article supported thereby is employed to insure that the upper edges of the plates 10—10 grip or bind against the opposite surfaces of the supported article, in the holder of Figure 5 this gripping or binding action is obtained by the form of the connecting member or members 23 and is independent of the weight of the article supported thereby.

If desired, one or the other of the plates 10—10 may be employed as a display card support by the simple expedient of employing in connection therewith the L-shaped supporting member 25, the short branch 26 of which is adapted to be inserted through the inwardly pressed portion 16 of the plate so employed. In such case, both the lower edge of the plate 10 and the free end of the member 25 rest upon a suitable supporting surface, the angular relation between the plate 10 and the member 25 being such as to support the plate 10 in a substantially vertical position or in a position slightly inclined with respect to the vertical. The plate 10 is, of course, adapted to slidably receive a removable display card, such as 14 of Figure 6. Thus, each plate 10 may be employed in conjunction with a corresponding plate to constitute a supporting holder for an article to be displayed, as illustrated in Figure 2, which may be employed independently of the second plate to constitute a holder for a display card, as illustrated in Figure 9.

Preferably, each of the plates 10—10 are bent upon themselves along the opposite vertically inclined edges thereof to provide a pair of strengthening flanges or ribs 26 (see Figure 10), these strengthening ribs being so turned relatively to the plane of the plate 10 as not to interfere with the free insertion of a display card, such as the card 14 of Figure 6, between the upper and lower edge channels 13—13 of the plate.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

What is claimed as new and useful is:—

1. In combination, a holder comprising a pair of angularly adjustable elements having horizontally extending upper and lower edges, the lower edges thereof being adapted to rest upon a supporting surface, said elements being provided with embossed straps intermediate their upper and lower edges, and a yielding member having angularly directed end portions extending through said straps, to maintain said elements yieldingly in predetermined angular relation, said member being adapted to flex under the weight of an object supported thereby whereby to angularly shift said elements so that the upper edges thereof impinge against opposite sides of and support such object against tilting.

2. In combination, a holder comprising a pair of angularly adjustable elements having upper and lower edges, the lower edges thereof being adapted to rest upon a supporting surface, said elements being provided with embossed straps intermediate their upper and lower portions, and a yielding member interconnecting said elements and having angularly directed opposite end portions extending through said straps, said member, when supporting an upwardly extending object, tending to flex under the weight of such object and so angularly shift said elements to thereby cause the upper portions thereof to grip and support such object against tilting.

HENRY HARRISON.